United States Patent Office 3,642,663
Patented Feb. 15, 1972

3,642,663
SOLUBLE QUATERNIZED CONDENSATION PRODUCTS OF EPIHALOHYDRINS AND POLYAMINES
Albert H. Greer, 228 Warwick Road, Haddonfield, N.J. 08033
No Drawing. Continuation of application Ser. No. 699,023, Jan. 19, 1968, which is a continuation-in-part of application Ser. No. 353,227, Mar. 19, 1964. This application Feb. 6, 1969, Ser. No. 797,256
Int. Cl. C07c 85/00; H01b 1/00
U.S. Cl. 252—500
18 Claims

ABSTRACT OF THE DISCLOSURE

A polar solvent soluble electroconductive quaternized condensation product is provided by reacting an alkylenepolyamine, a polyalkylenepolyamine or mixtures thereof with an epihalohydrin in a polar solvent to such an extent that there is little or no crosslinking in the condensation product and by quaternizing the condensation product with a quaternizing agent. Typical useful epihalohydrins are epibromohydrin and epichlorohydrin. Typical useful alkylenepolyamines are those having at least one tertiary amino group and at least one primary or secondary amino group and include dimethylaminopropylamine, N-aminopropyldiethanolamine and N-aminopropylmorpholine. The solutions of the quaternized condensation products are useful as impregnating and coating agents for making electroconductive paper, liquid ion exchangers in non-aqueous systems, coagulant acids, acid corrosion inhibitors and anti-static agents.

CROSS REFERENCE TO RELATED APPLICATIONS

This application is a continuing application of my co-pending application Ser. No. 699,023 filed on Jan. 19, 1968, now abandoned. Application Ser. No. 699,023 is a continuation-in-part of application Ser. No. 353,227 filed Mar. 19, 1964 and now abandoned.

BACKGROUND OF THE INVENTION

This invention relates to electroconductive condensation products of an epihalohydrin and an alkylenepolyamine having at least one tertiary amino group and at least one primary or secondary amino group and particularly relates to polar solvent soluble electroconductive quaternized condensation products of epihalohydrins and alkylenepolyamines having at least one tertiary amino group and at least one primary or secondary amino group dissolved in aqueous or non-aqueous polar solvents. This invention also relates to solutions of condensation products of epihalohydrins and alkylenepolyamines having at least one tertiary amino group and at least one primary or secondary amino group in admixture with a polyalkylenepolyamine having only primary and secondary amino groups, and to the quaternization and neutralization of the aforesaid condensation products.

Prior art condensation products of epihalohydrin and an alkylenepolyamine have been disclosed by Greer in U.S. Pat. 2,898,310 for the preparation of highly basic anion exchange resins which possess a high capacity for the removal of weak and strong anions from an aqueous solution. By the nature of their preparation these prior art condensation products are highly crosslinked polymers, and due to this high amount of crosslinking they are insoluble in aqueous and non-aqueous polar solvents. For this reason the solvent-insoluble prior art condensation products are not useful under circumstances where the characteristics of a particular process require the use of a polymer solution to accomplish a desired result, for example, in providing for impregnating and coating agents for making electroconductive paper, in providing liquid ion exchangers in non-aqueous systems, in making coagulant aids or in making acid corrosion inhibitors, all such uses requiring solvent solubility.

Since the prior art highly crosslinked condensation products of epihalohydrin and an alkylenepolyamine provided a three-dimensional structure suitable for making an anion exchange resin, it was determined that such a condensation product having little or no crosslinking having nitrogen atoms suitably arranged in the condensation structure and having strongly polar groups formed by means of quaternization, would provide a polymer having electrical conductivity properties which would render the polymers useful as impregnating and coating agents for making electroconductive paper, in providing liquid ion exchangers in non-aqueous systems, in making coagulant aids, in making acid corrosion inhibitors and in other processes in which electrical conductivity of a continuous nature is necessary for the successful operation of the process. It is therefore the primary object of this invention to provide a quaternized polymeric condensation product of an epihalohydrin and an alkylenepolyamine having little or no crosslinking which demonstrates electrical conductivity.

Solvent soluble polymer products having electrical conductivity have been shown to demonstrate utility in several areas including the areas of making electroconductive papers, in liquid ion exchangers in non-aqueous systems, coagulant aids and acid corrosion inhibitors. Since these applications are difficult to accomplish with conductive polymers having a high degree of crosslinking which renders the polymers insoluble in aqueous and certain non-aqueous solvents, it is desirable to provide a conductive polymer which is soluble in aqueous and certain non-aqueous solvents. Therefore, it is another object of this invention to provide a quaternized, electroconductive polymeric condensation product of an epihalohydrin and an alkylenepolyamine having little or no crosslinking which is soluble in aqueous and certain non-aqueous polar solvents.

Other objects and advantages of this invention will become apparent to those skilled in the art.

DESCRIPTION OF THE PREFERRED EMBODIMENTS

Briefly stated, the soluble quaternized products of this invention are prepared by reacting an epihalohydrin and an aqueous or non-aqueous polar solution of an alkylenepolyamine having at least one tertiary amino group or mixture of an alkylenepolyamine having at least one tertiary amino group and a polyalkylenepolyamine having only primary and secondary amino groups under polymerization conditions that are unfavorable to cross-linking, quaternizing the condensate in situ and neutralizing the resulting solution. Neutralization of the solution may also be carried out prior to quaternization.

We have found that crosslinking is inhibited by maintaining the epihalohydrin and polyamine which we disclose, within a mole ratio between about 0.5–1.75, and that subsequent crosslinking is inhibited by neutralizing the condensation product thereby forming a soluble condensation product. Furthermore, we have found that an intervening quaternization of this soluble condensation product improves the desired properties.

The presence of at least one tertiary amino group is preferred since it is desirable to have quaternary ammonium groups formed by the reaction of the epihalohydrin and the tertiary amine moiety pre-existing in the structure of the condensation product prior to quaternization by a quaternizing agent. The presence of a quaternary group in the molecule will enhance the anti-static properties of that molecule. Moreover, the greater the number of such quaternary ammonium groups present, the greater will be the anti-static properties of the materials. For this reason, it is desirable to treat the condensation product with a quaternizing agent such as an alkyl halide.

Suitable alkylenepolyamines are those having at least one tertiary amino group and, preferably, are those having at least one tertiary amino group together with at least one primary or secondary amino group. The tertiary amino groups are desirably dialkylamino groups, and preferably are lower dialkylamino groups.

The materials of this invention may also be prepared by condensing an epihalohydrin with a mixture of an alkylenepolyamine having at least one tertiary amino group and a polyalkylenepolyamine having only primary and secondary amino groups.

The condensation may be effected in an aqueous medium, in an non-aqueous medium or in a mixture of water and a compatible non-aqueous medium. The non-aqueous medium can be methanol, ethanol, or the like. After the condensation has been achieved, the product, which is completely soluble in the liquid reaction medium, is quaternized in situ by treatment with a quaternizing agent in a slightly alkaline medium and then neutralized to prevent crosslinking.

In accordance with this invention, an epihalohydrin and an aqueous or non-aqueous solution of an alkylenepolyamine or mixture of an alkylenepolyamine and a polyalkylenepolyamine are subjected to condensation and permitted to polymerize until a somewhat viscous syrup is produced. In general, the temperatures of operation during the addition of the epihalohydrin to the water solution of amines are between 15° C. and 40° C. The time of the addition can be varied between 1 and 3 hours. After the addition of the epihalohydrin, the mixture is allowed to stir for about an additional half-hour to an hour at ambient temperatures or longer if necessary. The entire mixture may then be treated in situ with a quaternizing agent with or without the presence of an alkali. Quaternization may be performed at temperatures between ambient and 100° C. under atmospheric or moderately super-atmospheric pressures. At the end of the quaternization period, if the medium is aqueous the pH of the medium is adjusted with a suitable acid such as hydrochloric or sulfuric acid, to a pH of approximately 6-7.

The soluble polymers that are formed have a relatively high electrical conductivity, negligible odor and color, and a viscosity equivalent to less than 100 centipoises for a 20% water solution at approximately 150° F. as determined with a viscosimeter.

In a typical application of these products, such as, an anti-static agent, a water-solution, prepared as above and adjusted to a pH of about 6 is applied by calendering, brushing, dipping, spraying or some other suitable means to a textile material made of a vinyl resin such as a vinyl chloride polymer or a polyacrylonitrile material. After the water-soluble polymeric material has been applied, the textile material is dried and is ready for further fabrication or processing.

In producing the soluble electroconductive materials according to this invention we have found that between about 0.5 to 1.75 moles of an epihalohydrin are required for each mole of alkylenepolyamine or mixture of alkylenepolyamine and polyalkylenepolyamine used. The preferred mole ratio is between about 0.8 to 1.25 moles. The use of a larger amount of epihalohydrin will increase crosslinking and progressively diminish the solubility of the product.

When the quaternizing agent is employed subsequent to the condensation reaction, it may be desirable to use a slight excess of the amount of reagent necessary to quaternize all of the non-quaternary ammonium nitrogen atoms (i.e., primary, secondary, and tertiary amino groups) of the condensation product. Although it is not mandatory to use an excess of quaternizing agent, generally, the greater the amount of quaternizing agent employed the greater will be the number of non-quaternary nitrogen atoms which are quaternized. This will result in a material having increased electroconductive properties.

I have found that epichlorohydrin and epibromohydrin are the most desirable of the epihalohydrins used in the preparation of the electroconductive materials of this invention.

The alkylenepolyamines having at least one tertiary amino group, which are employed in producing the electroconductive materials, are desirably the lower alkylenepolyamines containing at least one tertiary amino group and at least one primary or secondary amino group such as dimethylaminopropylamine (N,N-dimethylpropylenediamine), diethylamino propylamine (N,N-diethylpropylenediamine), N-aminopropylmorpholine, dimethylaminoethylamine, diethylaminoethylamine, N-aminopropyldiethanolamine, N-methyliminobispropylamine, and the like. Other alkylenepolyamines containing at least one tertiary amino group and at least one secondary amino group may also be employed such as N,N-dimethyl-N'-methylpropylenediamine; N,N-dimethyl - N' - methylethylenediamine; N,N-diethyl-N'-ethylethylenediamine, and the like. Dimethylaminopropylamine has been found to be particularly suitable.

Suitable quaternizing agents are the alkyl halides such as methyl chloride, bromide, and iodide, ethyl chloride, bromide, and iodide, and the like; dialkyl sulfates such as dimethyl, diethyl, dipropyl, dibutylsulfates; alkyl esters of aryl sulfonates such as methyl toluene sulfonate and methyl benzene sulfonate; alkylhalo esters such as ethylchloroacetate; alkylene halohydrins such as ethylenechlorohydrin; lactones such as beta-propiolactone; and the alkylene oxides such as ethylene oxide and propylene oxide.

Among the polyalkylenepolyamines having only primary and secondary amino groups which may be employed in conjunction with the above described alkylenepolyamines having a tertiary amino group are desirably the lower polyalkylenepolyamines, such as the polyethylenepolyamines, diethylenetriamine, triethylenetriamine, tetraethylenepentamine, and the like or a polypropylenepolyamine, such as iminobispropylamine. Iminobispropylamine is particularly suitable.

In order to disclose more clearly the nature of the present invention specific examples illustrating the preparation of the soluble polymeric material will hereafter be described. This is done solely by way of example and is intended neither to delineate the scope of the invention nor to limit the appended claims.

EXAMPLE I

In a two-liter, three-necked flask equipped with a stirrer, thermometer, and a dropping funnel was placed 102 grams of dimethylaminopropylamine in 612 grams of water. The solution was cooled to 25° C. with a surrounding water bath, and 161 grams of epichlorohydrin (mole ratio 1.75:1 of epichlorohydrin to dimethylaminopropylamine) was added for 1 hour at 25° C. The mixture was allowed to react for an additional 30 minutes. At the end of this time the material was acidified to a pH of about 6-7 with sulfuric acid. The soluble polymer thus formed is now suitable for in situ quaternization and neutralization to form a solution of this invention. The conductivity of the polymer product of this example was measured by determining the surface resistance of standard stock paper coated with the polymer product, the conductivity being shown in the table below.

EXAMPLE II

In a two-liter, three-necked flask equipped with a stirrer, thermometer, and dropping funnel was placed 452 grams of dimethylaminopropylamine in 820 ml. of water. The solution was cooled to 25° C. with a surrounding water bath, and 368 grams of epichlorohydrin (0.9:1 mole ratio of epichlorohydrin to dimethylaminopropylamine) was added for 1 hour. The mixture was stirred for an additional 30 minutes, and placed in an autoclave with 100 grams of sodium hydroxide pellets. The autoclave was closed and the mixture was stirred and heated to 50° C. Then 300 grams of methyl chloride was passed in at 40-50 p.s.i. After the desired amount of methyl chloride was passed in, the autoclave was cooled and discharged. The solution was adjusted to a pH of approximately 6-7 with dilute sulfuric acid. The conductivity of the polymer product of this example was measured by determining the surface resistance of standard stock paper coated with the polymer product, the conductivity being shown in the table below.

In a three-liter, three-necked flask equipped with a stirrer, thermometer and dropping funnel was placed 306 grams of dimethylaminopropylamine in 3000 ml. of water. The solution was cooled to 20° C. with a surrounding water bath; and 333 grams of epichlorohydrin (1.2:1 mole ratio of epichlorohydrin to dimethylaminopropylamine) was added for 2 hours. The mixture was stirred for an additional 30 minutes at a temperature below 25° C. followed by stirring at room temperature for one half hour. The mixture was neutralized to a pH of about 6-7 by using dilute sulfuric acid.

Dimethylsulfate, 378 grams, was added while maintaining the pH at 8-9 with 5 N potassium hydroxide in water, and the mixture was heated at reflux for 5 hours. The conductivity of the polymer product of this example was measured by determining the surface resistance of standard stock paper coated with the polymer product, the conductivity being shown in the table below.

EXAMPLE IV

In a two-liter, three-necked flask equipped with a stirrer, thermometer, and dropping funnel was placed 452 grams of dimethylaminopropylamine in 820 cc. of methanol. The solution was cooled to 25° C. with a surrounding water bath, and 368 grams of epichlorohydrin (0.9:1 mole ratio of epichlorohydrin to dimethylaminopropylamine) was added for 1 hour. The mixture was stirred for an additional 30 minutes at 25° C.

In a two-liter, three-necked flask equipped with a stirrer, and thermometer was placed 820 grams of the condensate prepared as described in the previous paragraph. To this was added dropwise 378 grams of dimethylsulfate at a temperature maintained below 30° C. with a water bath. The pH was maintained at 8-9 with dropwise addition of a 5 N potassium hyroxide solution in methanol. When all of the reactant had been added the mixture was heated to reflux temperature for 5 hours and cooled. The conductivity of the polymer product of this example was measured by determining the surface resistance of standard stock paper coated with the polymer product, the conductivity being shown in the table below.

EXAMPLE V

Two hundred (200) grams of the polymer in water solution formed in accordance with paragraph 1 of Example IV was placed in a two-liter, three-necked flask equipped with a stirrer, thermometer and a water bath. To this solution there was added 216 grams of beta-propiolactone dropwise for 3 hours at a temperature maintained below 30° C. Stirring was continued for several hours, and the clear solution had a solids content of 70.5%. The solution was adjusted to a pH of 6-7. The conductivity of the polymer product of this example was measured by determining the surface resistance of standard stock paper coated with the polymer product, the conductivity being shown in the table below.

EXAMPLE VI

In a two-liter, three-necked flask equipped with a stirrer, thermometer and dropping funnel was placed 820 ml. of water, and the water was cooled to less than 20° C. with a surrounding water bath. Thereafter 406.8 grams of dimethylaminopropylamine and 58.0 grams of iminobispropylamine were added, and the solution was cooled to less than 20° C. Keeping the temperature below 20° C., 368 grams of epichlorohydrin (1.1:1 mole ratio of epichlorohydrin to dimethylaminopropylamine and iminobispropylamine) was added during a four hour period. The solution was allowed to stir for an additional 30 minutes at room temperature. The pH was then adjusted to a pH of 6-7 with sulfuric acid and the mixture was placed in an autoclave with 174 grams of sodium hydroxide pellets. The autoclave was closed and the mixture was stirred and heated to 50° C. Three hundred forty-six (346) grams of methyl chloride was then passed in at 40-50 p.s.i. When the desired amount of methyl chloride was added the autoclave was cooled and discharged. The solution was adjusted to a pH of 6-7. The conductivity of the polymer product of this example was measured by determining the surface resistance of standard stock paper coated with the polymer product, the conductivity being shown in the table below.

EXAMPLE VII

In a two-liter, three-necked flask equipped with a stirrer, reflux condenser and thermometer was placed 624 ml. of water and 648 grams of N-aminopropyldiethanolamine. The temperature rose to 45° C. and the solution was cooled with a surrounding water bath to below 25° C. To the solution there was added dropwise 368 grams of epichlorohydrin (0.9:1 mole ratio or epichlorohydrin to N-aminopropyldiethanolamine) for 4 hours at 25° C. One thousand fifty-five (1055) grams of the condensate water solution was placed in a two-liter, three-necked flask equipped with a stirrer, thermometer and a cooling bath, and 147 grams of propylene oxide was added dropwise over a period of 2 hours at room temperature and allowed to stir an additional hour at room temperature. The solution was adjusted to a pH of 6-7. The conductivity of the polymer product of this example was measured by determining the surface resistance of standard stock paper coated with the polymer product, the conductivity being shown in the table below.

EXAMPLE VIII

In a two-liter, three-necked flask equipped with a stirrer, thermometer and a heating mantle was placed 534 grams of the condensate described in paragraph 1 of Example VII. To this solution there was added 93 grams of ethylenechlorohydrin during two hours. The solution was allowed to stir for another hour at room temperature. The conductivity of the polymer product of this example was measured by determining the surface resistance of standard stock paper coated with the polymer product, the conductivity being shown in the table below.

EXAMPLE IX

In a one-liter, three-necked flask equipped with a stirrer, thermometer and a water bath were placed 145 grams of N-methyliminobispropylamine and 227 grams of water. The solution was cooled to 25° C., and 83.5 grams of epichlorohydrin (0.9:1 mole ratio of epichlorohydrin to N-methyliminobispropylamine) was added slowly over a four hour period keeping the temperature below 25° C. At the end of this time 154 ml. of water followed by 154 grams of diethylsulfate was added at once, and the mixture was heated to 50° C. for four hours. The pH was adjusted to a pH of 6–7. The conductivity of the polymer product of this example was measured by determining the surface resistance of standard stock paper coated with the polymer product, the conductivity being shown in the table below.

EXAMPLE X

In a one-liter, three-necked flask equipped with a thermometer, stirrer, dropping funnel and a cooling bath were placed 144 grams of N-aminopropylmorpholine and 222 ml. of water. The solution was cooled to 25° C., and 83.5 grams of epichlorohydrin (0.9:1 mole ratio of epichlorohydrin to N-aminopropylmorpholine) was added dropwise during four hours at a temperature of 25° C. At the end of this time 154 ml. of water followed by 126 grams of dimethylsulfate was added while maintaining the pH at 8–9 with 5 N potassium hydroxide solution, and the solution was heated to 50° C. for four hours. The solution was adjusted to a pH of 6–7. The conductivity of the polymer product of this example was measured by determining the surface resistance of standard stock paper coated with the polymer product, the conductivity being shown in the table below.

EXAMPLE XI

In a one-liter, three-necked flask equipped with a thermometer, dropping funnel, stirrer and a cooling bath were placed 102 grams of dimethylaminopropylamine and 225 ml. of water. The solution was cooled to 25° C., and 123 grams of epibromohydrin (0.9:1 mole ratio of epibromohydrin to dimethylaminopropylamine) was added dropwise during three hours at a temperature of 25° C. At the end of this time 154 ml. of water followed by 126 grams of dimethylsulfate was added while maintaining the pH at 8–9 with 5 N potassium hydroxide solution, and the mixture was heated to 50° C. for four hours. After cooling the pH was adjusted to approximately 6–7 with sulfuric acid. The conductivity of the polymer product of this example was measured by determining the surface resistance of standard stock paper coated with the polymer product, the conductivity being shown in the table below.

The conductivity of the polymeric condensation product of each example was determined by measurement of the resistivity of standard stock paper which had been precoated with the polymer from a solution of the condensation product. In each case the surface resistance was determined at about 18–20% relative humidity unless otherwise indicated. Paper which has a resistance in the order of about $10^{13}$–$10^{15}$ ohms per square, was cut into sections of approximately 4 inches x 6 inches and was soaked in the polymer solution selected from the example under evaluation. After a soaking period of 60 seconds the paper was removed from the soaking bath, passed through rollers to remove excess solution from the paper and air dried. After drying the paper was trimmed to a size of 3 inches x 5 inches and placed in a humidity chamber at 18–20% relative humidity for 24 hours after which the resistivity of the paper was measured by placing the 3 inch x 5 inch paper on a flat surface and covering the paper with an electrode device which measures the resistivity of the surface by a pair of one centimeter wide electrodes spaced one centimeter apart. The resistance determined in this manner in the controlled humidity chamber is read directly on the ohm meter in megohms and converted to the common usage term of ohm per square centimeter. In order to provide uniform data, solids pickup from the polymer solution by the paper is maintained to within 2% of the weight of the paper.

TABLE I

| Example No. | Percent solids pick-up by paper | Relative humidity | Resistivity (ohms/cm.²) |
| --- | --- | --- | --- |
| I | 1.2 | 20 | $4.9 \times 10^{12}$ |
| II | 2.0 | 20 | $4.0 \times 10^{11}$ |
| III | 2.0 | 19 | $1.4 \times 10^{13}$ |
| IV | 2.0 | 19 | $1.2 \times 10^{14}$ |
| V | 2.0 | 19 | $1.7 \times 10^{14}$ |
| VI | 2.0 | 19 | $3.2 \times 10^{12}$ |
| VII | 1.9 | 18 | $1.4 \times 10^{10}$ |
| VIII | 2.2 | 18 | $1.7 \times 10^{10}$ |
| IX | 2.0 | 19 | $9.1 \times 10^{13}$ |
| X | 2.0 | 19 | $2.2 \times 10^{14}$ |
| XI | 2.0 | 19 | $1.3 \times 10^{14}$ |
| Control | | 19 | $1.5 \times 10^{15}$ |

The solutions prepared according to this invention are suitable for use as water solutions or where it is advantageous or desirable, they may be prepared and used in a wide variety of polar solvents. Although I have discussed the quaternization of these compounds, varying the degree of quaternization to achieve different levels of conductivity or solubility is within the scope of this invention.

The present invention provides a quaternized polymeric condensation product, of an epihalohydrin and an alkylenepolyamine which demonstrates electrical conductivity, and a process for the manufacture thereof. Moreover, it provides a quaternized, electroconductive polymeric condensation product of an epihalohydrin and an alkylenepolyamine which is soluble in aqueous and certain non-aqueous polar solvents.

It is to be understood that the invention is not to be limited by these examples or by the specific reaction conditions described for their preparation, but includes variations and modifications falling within the scope the appended claims.

I claim:

1. A quaternized, polar solvent soluble, electroconductive polymeric condensate made by the process of reacting a mixture consisting essentially of an alkylenepolyamine and an epihalohydrin at a temperature of less than about 40° C. whereby said alkylenepolyamine and said epihalohydrin undergo condensation reaction to produce a substantially uncrosslinked polymeric condensate and quaternizing said uncrosslinked polymeric condensate with a suitable quaternizing agent.

2. The polymeric condensate of claim 1 made by the process of forming a mixture consisting essentially of an alkylenepolyamine and an epihalohydrin in a polar solvent, said alkylenepolyamine having at least one tertiary amino group and at least one group selected from primary and secondary amino groups, said epihalohydrin being present in a molecular ratio of epihalohydrin to alkylenepolyamine of about 0.5:1 to about 1.75:1, maintaining said mixture at a temperature below about 40° C., whereby said alkylenepolyamine and said epihalohydrin undergo condensation reaction to produce a substantially uncrosslinked polar solvent soluble polymeric condensate.

3. The condensate of claim 1, wherein after condensation the condensate-polar solvent solution is adjusted to a pH of between about 6 to about 7.

4. The condensate of claim 1, wherein said epihalohydrin is epichlorohydrin.

5. The condensate of claim 1, wherein said epihalohydrin is epibromohydrin.

6. The condensate of claim 1, wherein said alkylenepolyamine is employed in admixture with a polyalkylene polyamine having only primary and secondary amino groups.

7. The condensate of claim 1, wherein said alkylenepolyamine is dimethylaminopropylamine.

8. The condensate of claim 1, wherein said alkylenepolyamine is N-aminopropyldiethanolamine.

9. The condensate of claim 1, wherein said alkylenepolyamide is N-methyl-iminobispropylamine.

10. The condensate of claim 1, wherein said alkylenepolyamine is N-aminopropylmorpholine.

11. The condensate of claim 1, wherein said polyalkylenepolyamine is iminobispropylamine.

12. The condensate of claim 1, wherein said polar solvent is water.

13. A process for preparing a soluble electroconductive, quaternized, polymeric condensation product, which comprises the steps of:
 (a) Condensing in a polar solvent at a temperature of less than about 40° C. an epihalohydrin and an alkylenepolyamine having at least one tertiary amino group and at least one tertiary amino group and at least one group selected from primary and secondary amino groups, wherein the molecular ratio of epihalohydrin to alkylenepolyamine employed in producing the condensate is between about 0.5 and 1.75:1; and
 (b) Quaternizing said condensate with a suitable quaternizing agent.

14. A solution suitable for treating materials such as paper, textiles and the like, thereby to make said materials electroconductive comprising a polar solvent and the quaternized polymeric condensate of claim 1.

15. The solution of claim 14 wherein said solvent is water.

16. The solution of claim 14 wherein said solvent is methanol.

17. The solution of claim 14 wherein said solvent is ethanol.

18. The solution of claim 14 wherein the pH of said solution is maintained between about 6 and about 7.

References Cited
UNITED STATES PATENTS

| | | | |
|---|---|---|---|
| 2,469,683 | 5/1949 | Dudley et al. | 260—2.1 |
| 2,898,310 | 8/1959 | Greer | 260—2.1 |
| 2,926,154 | 2/1960 | Keim | 260—2.1 |
| 3,005,786 | 10/1961 | Greer | 260—2.1 |
| 3,234,150 | 2/1966 | Feldt et al. | 260—2.1 |

DOUGLAS J. DRUMMOND, Primary Examiner

U.S. Cl. X.R.

260—567.6 P, 2.1 E